(12) United States Patent
Knorr et al.

(10) Patent No.: US 10,486,088 B2
(45) Date of Patent: Nov. 26, 2019

(54) HYDROCYCLONE SEPARATOR

(71) Applicant: Metso Minerals Industries, Inc., Waukesha, WI (US)

(72) Inventors: Brian Knorr, Henrico, VA (US); Lars Grönvall, Trelleborg (SE); Matt Gallimore, York, PA (US)

(73) Assignee: Metso Minerals Industries, Inc., Waukesha, WI (US)

( * ) Notice: Subject to any disclaimer, the term of this patent is extended or adjusted under 35 U.S.C. 154(b) by 45 days.

(21) Appl. No.: 15/966,900

(22) Filed: Apr. 30, 2018

(65) Prior Publication Data

US 2018/0369720 A1    Dec. 27, 2018

(30) Foreign Application Priority Data

Jun. 22, 2017 (EP) .................................... 17177480

(51) Int. Cl.
*B01D 21/26* (2006.01)
*B01D 21/24* (2006.01)
(Continued)

(52) U.S. Cl.
CPC ........ *B01D 21/267* (2013.01); *B01D 21/2411* (2013.01); *B01D 21/265* (2013.01); *B04C 5/18* (2013.01); *B04C 5/24* (2013.01)

(58) Field of Classification Search
CPC .............. B01D 21/2411; B01D 21/265; B01D 21/267; B04C 5/18; B04C 5/24
See application file for complete search history.

(56) References Cited

U.S. PATENT DOCUMENTS 2,649,963 A   8/1953   Fontein
2,829,771 A   4/1958   Dahlstrom
(Continued)

FOREIGN PATENT DOCUMENTS

CN      103588260 A    2/2014
WO       03037476 A1    5/2003

OTHER PUBLICATIONS

European Search Report for European Patent Application No. 17177480.5 dated Feb. 1, 2018.
(Continued)

*Primary Examiner* — Dirk R Bass
(74) *Attorney, Agent, or Firm* — Andrus Intellectual Property Law, LLP (57) ABSTRACT

A hydrocyclone separator and a method for classifying solid material in liquid suspension are presented. The hydrocyclone separator comprises a head portion having an inlet conduit and an overflow discharge tube arranged in the head portion. The hydrocyclone separator further has an apex discharge port and a tapered separation portion arranged between the head portion and the apex discharge port. The tapered separation portion is tapering distally away from the head portion. Moreover, the hydrocyclone separator has a flow support portion with at least one flow support inlet configured to inject a fluid along at least a portion of an inner surface of the flow support portion towards the apex discharge port, when the hydrocyclone separator is oriented such that the apex discharge port is at a vertically elevated position relative to the overflow discharge tube. Hereby, a hydrocyclone separator capable of achieving improved operational efficiency with reduced risk of clogging the apex discharge port is presented.

28 Claims, 10 Drawing Sheets

(51) Int. Cl.
*B04C 5/18* (2006.01)
*B04C 5/24* (2006.01)

(56) References Cited

U.S. PATENT DOCUMENTS 3,379,308 A     4/1968   Horiuchi
4,253,945 A     3/1981   Karnis
9,914,139 B2 *  3/2018   Kucher .................. B04C 5/081

OTHER PUBLICATIONS

International Search Report and Written Opinion for International Patent Application No. PCT/US2018/038938 dated Oct. 15, 2018.

* cited by examiner (Prior art) Fig. 1

HYDROCYCLONE SEPARATOR

CROSS REFERENCE TO RELATED APPLICATION

The present application is based on and claims priority to European Patent Application Serial Number 17177480.5, filed Jun. 22, 2017, the disclosure of which is incorporated herein by reference.

TECHNICAL FIELD OF THE INVENTION

The present invention relates to an apparatus for classifying particulate material, such as e.g. aggregates. More specifically the present invention relates to hydrocyclone separator for classifying solid material in liquid suspension. The present invention also relates to a system comprising a plurality of hydrocyclone separators and to a method for classifying solid material in liquid suspension.

BACKGROUND

Hydrocyclone separators are known to be useful for the classification or fractionation of coarse from fine solids suspended in a liquid. In general, a hydrocyclone is an enclosed vertical machine usually comprising a short cylindrical section (head portion) followed by a (conical) tapered section. Feed of a suspension of solids is supplied under predetermined pressure tangentially or in a volute path into the head portion so as to create therein a swirling stream of fluid, which stream follows a path of gradually decreasing radius toward the point of the narrowest radius of the cone, commonly known as the apex.

As the spiral path approaches the apex of the hydrocyclone, a portion of it turns and begins to flow towards the opposite end, i.e. towards the cylindrical section. Also this flow is in a spiral path of radius smaller than the radius of the first spiral while rotating in the same direction. Thus a vortex is generated within the hydrocyclone. The pressure will be lower along the central axis of the vortex and increase radially outwardly. The idea is that the hydrocyclone will separate the particles of the slurry according to shape, size and specific gravity with faster settling particles moving towards the outer wall of the hydrocyclone eventually leaving the hydrocyclone through the apex discharge port. Slower settling particles will move towards the central axis and travel towards the head portion, eventually leaving the hydrocyclone through the overflow discharge tube. The discharge tube is normally extending down into the cylindrical section such that short circuiting of the feed is prevented.

The efficiency of this operation, that is the sharpness of the separation of the coarser from the finer particles, depends on various factors, such as e.g. the size of the apex opening, the feed speed, and the density of the material to be separated and classified. Also the length of the conical section from the cylindrical part to the apex opening will have an impact on the operation of the separation and/or classification.

This separation according to shape, size and specific gravity is sometimes referred to as "stratification". However, this stratification of the material is not always fully achieved thus causing incomplete classification. Further, the apex opening has a tendency to get clogged during operation, particularly when the separation of particles is rather efficient which results in a very sluggish or dense mass being pushed through the apex opening, and there may be a need to prevent or elevate any such condition.

Thus, there is still a need for improvements in this technical field, and more specifically there is a need for a hydrocyclone separator which provides for good separation but at the same time reduces the risk of the apex getting clogged during operation.

SUMMARY OF THE INVENTION

It is therefore an object of the present invention to provide a hydrocyclone separator, a system and a method for classifying solid material in liquid suspension, which alleviates all or at least some of the above-discussed drawbacks of the presently known systems.

Another object is to provide a hydrocyclone with improved stratification properties as compared to presently known solutions.

In the following, the term exemplary is to be understood as serving as an example, instance, or illustration.

These and other objects are achieved by means of a hydrocyclone separator, a system and a method for classifying solid material in liquid suspension as defined in the appended claims.

According to a first aspect of the present invention, there is provided a hydrocyclone separator for classifying solid material in liquid suspension. The hydrocyclone separator comprises a head portion having an inlet conduit adapted to feed a suspension into the head portion, an overflow discharge tube arranged in the head portion, and an apex discharge port. The hydrocyclone separator further comprises a tapered separation portion arranged between the head portion and the apex discharge port, the tapered separation portion having a proximal end and a distal end, and wherein the tapered separation portion tapers towards the distal end. Moreover, the hydrocyclone separator comprises a flow support portion provided at the tapered separation portion or between the tapered separation portion and the apex discharge port. The flow support portion comprises at least one flow support inlet configured to inject a fluid along at least a portion of an inner surface of the flow support portion in a direction at least partly towards the apex discharge port. The hydrocyclone separator is configured to be oriented such that the apex discharge port is at a vertically elevated position relative to the overflow discharge tube.

Hereby, a hydrocyclone separator capable of achieving improved operational efficiency with reduced risk of clogging the apex discharge port is presented. Improved or increased operational efficiency is in the present context to be construed as improved performance in terms of e.g. stratification, material classification, desliming, fines recovery, densifying and dewatering.

In the context of the present disclosure, the term distal or distally is to be construed as towards the apex discharge port and the term proximal or proximally is to be construed as towards the head portion. Moreover, the terms overflow and underflow are considered represent their normal meaning in the art, in spite of the fact that the inventive hydrocyclone is configured to be used in an upside-down orientation, making the overflow outlet (i.e. outlet of light components) arranged "below" the underflow outlet (i.e. outlet of heavy components).

The present invention is at least partly based on the realization that by arranging the hydrocyclone separator in an upside-down configuration the overall operational efficiency can be increased, but at the cost of increased risk of clogging the apex discharge port. Thus, the present inventors realized that by providing a flow support portion with at least one flow support inlet, which is/are used to form a supporting fluid flow along the inner walls of the apex discharge port, the risk of sluggish/dense mass sticking to the inner walls of the apex discharge port is reduced. Stated differently, the flow support inlet(s) provide(s) a type of "lubrication" and support to the underflow discharge through the apex discharge port.

Since the hydrocyclone is, during operation, in an upside down orientation (may also be referred to as inverted or semi-inverted orientation), the underflow discharge is supported by feed pressure and opposed by gravity, in contrast to conventional systems where the underflow discharge is supported by feed pressure and by gravity. The nozzle system (flow support inlet(s)) accordingly at least partly compensates for the gravitational pull in the inventive hydrocyclone separator. The set of flow support inlet(s) may be arranged to inject liquid (such as e.g. water) or to inject gas (such as e.g. air), or a combination thereof.

The term "upside-down configuration" is to be understood as that, in use, the hydrocyclone separator is oriented such that the apex discharge port is at a vertically elevated position relative to the overflow discharge tube. Stated differently, in use, the elongated center axis of the hydrocyclone forms an angle in the range of 91°-269° relative to a vertical reference axis, if a perfectly straight, conventional, configuration is considered to be 0°. A perfectly straight configuration is where the overflow discharge port is arranged straight above the apex discharge port and the center axis is perfectly vertical. Thus, the term "upside-down configuration" is not necessarily to be construed as limited to only a 180° orientation, where the apex discharge port is straight above the overflow discharge port.

The flow support portion may for example be an integrated part of the distal end of the tapered separation portion in close proximity to the apex discharge port. Therefore, in accordance with at least one exemplary embodiment of the present invention, at least one flow support inlet is arranged at a distal half, away from the head portion, of the tapered separation portion. The distal half of the tapered separation portion is the half closer to the distal end (i.e. closer to the apex discharge port). Stated differently, according to at least one exemplary embodiment of the present invention, the hydrocyclone separator comprises a set of flow support inlets arranged in the tapered separation portion and configured to inject a fluid along at least a portion of an inner surface of the tapered separation portion in a direction towards the apex discharge port.

However, the flow support portion may also be a separate component or part which is connected between the distal end of the tapered separation portion and the apex discharge port. Thereby allowing for quick and simple retrofitting of conventional hydrocyclone separators. Moreover, the flow support portion may have a generally cylindrical shape, which may or may not be tapered.

Moreover, the proximal end of the tapered separation portion may be connected directly to the head portion, or alternatively, the hydrocyclone separator may further comprise an intermediate (spacer) part or portion arranged between the head portion and the proximal end of the tapered separation portion.

Further, in accordance with at least one exemplary embodiment of the present invention, the flow support portion comprises a plurality of flow support inlets configured to inject a fluid along at least a portion of an inner surface of the flow support portion in a direction towards the apex discharge port. Still further, in accordance with at least one exemplary embodiment of the invention, the plurality of flow support inlets are arranged along a circumference of the flow support portion.

Further, the flow support inlet(s) may be configured such that the injected fluid forms a (continuous) sheet or film of fluid along the inner wall of the hydrocyclone separator, the injected fluid supporting the underflow discharge. Alternatively, in the exemplary embodiments comprising a plurality of flow support inlets, they may be configured such that the injected fluid forms multiple parallel streams running along the inner wall of the hydrocyclone separator, the injected fluid supporting the underflow discharge.

Further, in accordance with at least one exemplary embodiment of the invention, the plurality of flow support inlets is arranged to inject a fluid along at least a portion of the inner surface of the flow support portion directly towards the apex discharge port. Thus, the injected fluid runs along the inner wall of the flow support portion and directly towards the apex, meaning that the injected fluid does not flow tangentially with the swirl or vortex created by the primary feed into the head portion. As previously mentioned, the fluid injected via the flow support inlets are adapted to support the underflow discharge and is independent from the feed into the head portion.

Yet further, in accordance with at least one exemplary embodiment of the invention, each flow support inlet is oriented so to inject a fluid in a direction at least partly opposite to the direction of gravity, when the hydrocyclone separator is oriented such that the apex discharge port is at a vertically elevated position relative to the overflow discharge tube.

The term "at least partly opposite to" does not necessarily mean perfectly anti-parallel (i.e. parallel but moving in opposite directions), but should rather be construed as, a vector representation of the injection direction having a component that is anti-parallel to the direction of the gravitational pull. In other words, the fluid injection works, to some extent, against the gravitational pull.

In accordance with another aspect of the present invention, there is provided a system comprising a plurality of hydrocyclone separators according to any one of the embodiments discussed in reference to the first aspect of the present invention. Thus, with this aspect of the invention, similar advantages and preferred features are obtained as in the previously discussed first aspect of the invention.

Further, in accordance with yet another aspect of the present invention, there is provided a method for classifying solid material in liquid suspension comprising:

providing a hydrocyclone separator comprising a head portion having an inlet conduit adapted to feed the liquid suspension into the head portion, an overflow discharge tube arranged axially in the head portion, an apex discharge port, a tapered separation portion arranged between the head portion and the apex discharge port, and a flow support portion provided between the tapered separation portion and the apex discharge port;

arranging the hydrocyclone separator in an orientation such that the apex discharge port is at a vertically elevated position relative to the overflow discharge tube;

feeding the liquid suspension into the inlet conduit such that a whirling stream of liquid suspension is formed in the hydrocyclone separator, the stream flowing in a spiral path towards the apex discharge port;

injecting a fluid along at least a portion of an inner surface of the flow support portion in a direction at least partly towards the apex discharge port.

Hereby, a method for classifying solid materials in liquid suspension, which provides for improved operational efficiency with reduced risk of clogging the apex discharge port is presented. The feeding step and injecting step need not be performed in any exact order.

With this aspect of the invention, similar advantages and preferred features are obtained as in the previously discussed first aspect of the invention, and vice versa.

Further, in accordance with at least one exemplary embodiment of the present invention, the step of injecting a fluid comprises injecting a fluid along at least a portion of the inner surface of the flow support portion in a direction transverse to the spiral path of the stream of liquid suspension and directly towards the apex discharge port. Accordingly, the injected fluid (different from the liquid suspension) is intended to act in support to the underflow discharge and to reduce the risk of clogging the apex discharge portion.

Moreover, in accordance with at least one exemplary embodiment of the present invention, the step of injecting a fluid further comprises injecting a fluid in a direction at least partly opposite to the direction of gravity. The term "at least partly opposite to" does not necessarily mean perfectly anti-parallel (i.e. parallel but moving in opposite directions), but should rather be construed as, a vector representation of the injection direction having a component that is anti-parallel to the direction of the gravitational pull. In other words, the fluid injection works, to some extent, against the gravitational pull.

Even further, in accordance with at least one exemplary embodiment of the present invention, the step of injecting a fluid further comprises forming a sheet of fluid along at least a portion of the inner surface of the flow support portion, the sheet of fluid flowing in a direction towards the apex discharge port. The sheet of fluid will accordingly form a type of cushion or spacer layer between the dense slurry flowing through the apex discharge port (i.e. the underflow).

Even further, in accordance with at least one exemplary embodiment of the invention, the flow support inlet is arranged in the form of an annular slot arranged along a circumference of the flow support portion. This combination of tangential fluid entry with an inclined annular slot of the flow support inlet will result in a spray of fluid along the surface that has a similar sliding vector to the slurry flowing toward the apex from the tapered separation portion.

In accordance with at least one exemplary embodiment of the present invention, the step of injecting a fluid further comprises injecting multiple streams of fluid along at least a portion of the inner surface of the flow support portion, each stream of fluid flowing in a direction towards the apex discharge port.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, example embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. Like reference characters refer to like elements throughout.

Figure 1:
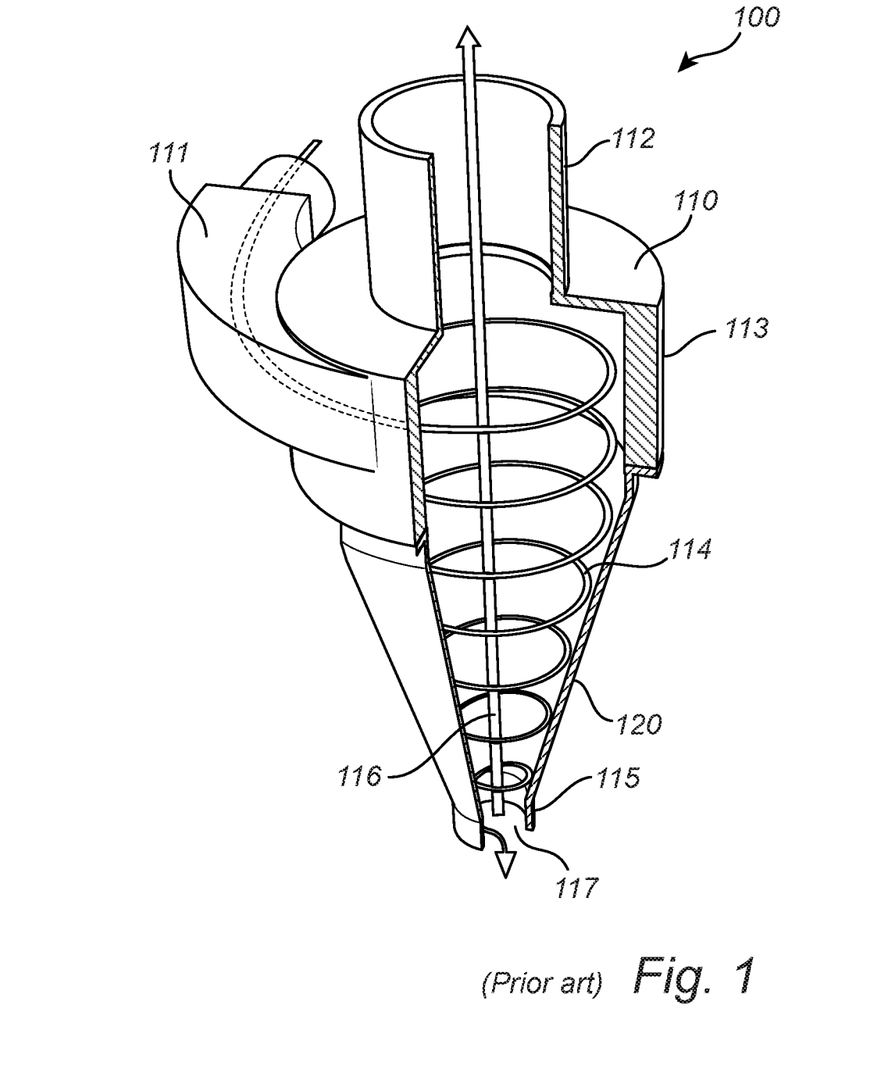
FIG. 1 is a partial cut-through perspective view illustration of a hydrocyclone separator as known in the prior art.

FIG. 1 shows a schematic view of a prior art hydrocyclone separator 100. That hydrocyclone separator 100 (or simply "hydrocyclone") comprises a cylindrical head portion 110. An inlet conduit 111 is arranged to feed a suspension of solid material into the cylindrical head portion 110, and an overflow discharge tube 112 is arranged axially through the top of the cylindrical head portion 110. The cylindrical head portion 110 is connected with a conically tapered separation part 120. The slurry is typically fed tangentially or in a volute path through the outer wall 113 of the head portion 110, thus creating a whirling motion 114 of the slurry which follows a path of gradually decreasing radius toward the point of the narrowest radius of the cone 120 and apex 115. As the spiral path approaches the apex 115 of the hydrocyclone 100, a portion 116 of it turns and begins to flow towards the opposite end, i.e. towards the head portion 110. Also this flow 116 is in a spiral path of radius smaller than the radius of the first spiral 114 while rotating in the same direction. Thus a vortex is generated within the hydrocyclone 100. The pressure will be lower along the central axis of the vortex and increase radially outwardly towards the outer wall 113 of the hydrocyclone 100. The hydrocyclone 100 will separate the particles of the slurry according to shape, size and specific gravity with faster settling particles moving towards the outer wall of the hydrocyclone 100 eventually leaving the hydrocyclone through the underflow 117. Slower settling particles will move towards the central axis and travel upwardly, eventually leaving the hydrocyclone through a discharge tube 112 (overflow). The discharge tube 112 is normally extending down into the head portion 110 such that a short circuiting of the feed is prevented (often referred to as a vortex finder, not shown). This separation according to shape, size and specific gravity can be denominated "stratification".

Figure 2A:
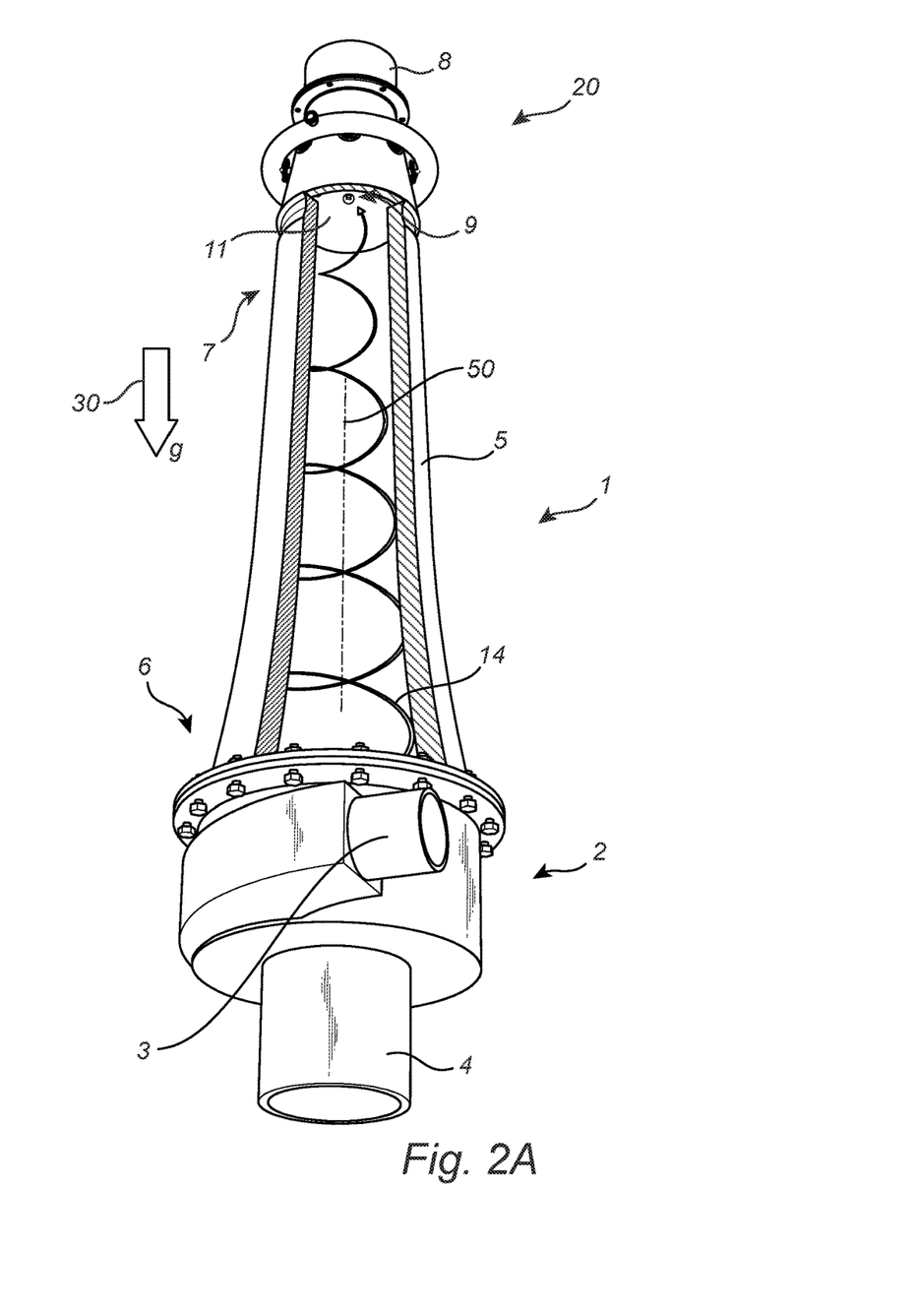
FIG. 2A is a partial cut-through perspective view illustration of a hydrocyclone separator in accordance with an embodiment of the present invention.

FIG. 2A illustrates a partial cut-through perspective view of a hydrocyclone separator 1 suitable for classifying solid material in liquid suspension. The hydrocyclone separator 1 has a head portion 2 having an inlet conduit 3 adapted to feed a suspension into the head portion 2. The head portion 2 is here illustrated as being cylindrical. However, as is already apparent for the skilled reader, further shapes are feasible, such as e.g. a cone shape (having a cone angle in the range of 0 to 20 degrees) or a curved shape. Moreover, the hydrocyclone 1 has an overflow discharge tube 4, arranged axially in the head portion 2. However, the overflow discharge tube 4 may also be arranged in other orientations in the head portion 2 (e.g. slanted or off-center).

Further, the hydrocyclone 1 has a tapered separation portion 5 with a proximal end 6 and a distal end 7. The proximal end 7 is connected to the head portion and the tapered separation portion 5 tapers towards the distal end 7. The head portion 2 is here shown as a removable or detachable part which is joined together with the tapered separation portion along a flange, however, other embodiments where the two parts are integrated in a single piece are feasible. Also, the hydrocyclone separator 1 may comprise an intermediate cylindrical (spacer) part arranged between the head portion 2 and the tapered separation portion 5 (not shown). Moreover, the tapered separation portion 5 may be a conically tapered separation portion, having a continuously decreasing cone angle, i.e. trumpet-shaped (as illustrated in FIG. 2A). Alternatively, the tapered separation portion 5 may have two or more tapered sections having different cone angles with larger cone angles close to the head part 2 (at the proximal end 6) and smaller cone angles further away from the head portion 2 towards the distal end 7. In yet another embodiment (not shown) the conically tapered separation portion 5 may comprise one tapered section having a single cone angle.

Even further, the hydrocyclone separator 1 comprises an apex discharge port 8 (underflow) arranged distally from tapered separation portion 5, with a flow support portion 20 arranged therebetween. The flow support portion 20 has one or more flow support inlets configured to inject a fluid along at least a portion of an inner surface 11 of the flow support portion in a direction at least partly towards the apex discharge port. Here, the flow support portion 20 is in the form of a plurality of flow support inlets 9 arranged in the tapered separation portion 5 and being configured to inject a fluid along at least a portion of an inner surface of the tapered separation portion 5 in a direction towards the apex discharge port 8. The set of flow support inlets 9 are barely visible in the perspective illustration shown in FIG. 2, therefore discussions related to the flow support inlets 9 will be provided in more detail with reference to FIGS. 3A-3C.

The hydrocyclone 1 is arranged in an upside down orientation, where the apex discharge port 8 is at a vertically elevated position relative to the overflow discharge tube 4. The upside down orientation provides advantages in terms of dewatering capability, meaning that the slurry being pushed through the apex discharge port 8 will be dense, resulting in an increased risk of clogging the apex discharge port 8. However, by providing a set of flow support inlets 9, that risk can be at least partly reduced, as the injected fluid forms a spacer layer or barrier between the dense slurry, providing for a decreased probability of the slurry sticking to the inner walls of the apex discharge port and/or the distal end 7 of the tapered separation portion 5 (and consequently reducing the risk of clogging).

In operation, a suspension is fed into the head portion 2, via the inlet conduit 3, in a volute path through the outer wall of the head part 2, creating an upwardly directed whirling motion 14 of the slurry (suspension) with a gradually decreasing radius. As the tapering spiral path 14 travels upwards and approaches the apex discharge port 8, a portion of the slurry turns and begins to flow downwards towards the head part 2. This returning flow (not shown) also follows a spiral path, albeit with a smaller radius than the upwardly directed spiral path 14. Accordingly, the pressure will be lower along the central axis 50 of the vortex generated within the hydrocyclone 1, and increase radially outwards. The faster settling particles will move towards the outer wall of the hydrocyclone 1 and be pushed upwards through the apex discharge port 8 (underflow) and the slower settling particles will move towards the central axis 50 and leave the hydrocyclone 1 via the overflow discharge tube 4. Moreover, the set of flow support inlets 9 will inject a fluid in an upwards direction towards the apex discharge port 8, thereby facilitating the underflow discharge, which works against the gravitational pull in this upside down configuration. Accordingly, each flow support inlet 9 is configured to inject a fluid in a direction at least partly against the direction of gravity 30, when the hydrocyclone separator 1 is oriented such that the apex discharge port 8 is at a vertically elevated position relative to the overflow discharge tube 4.

Figure 2B:
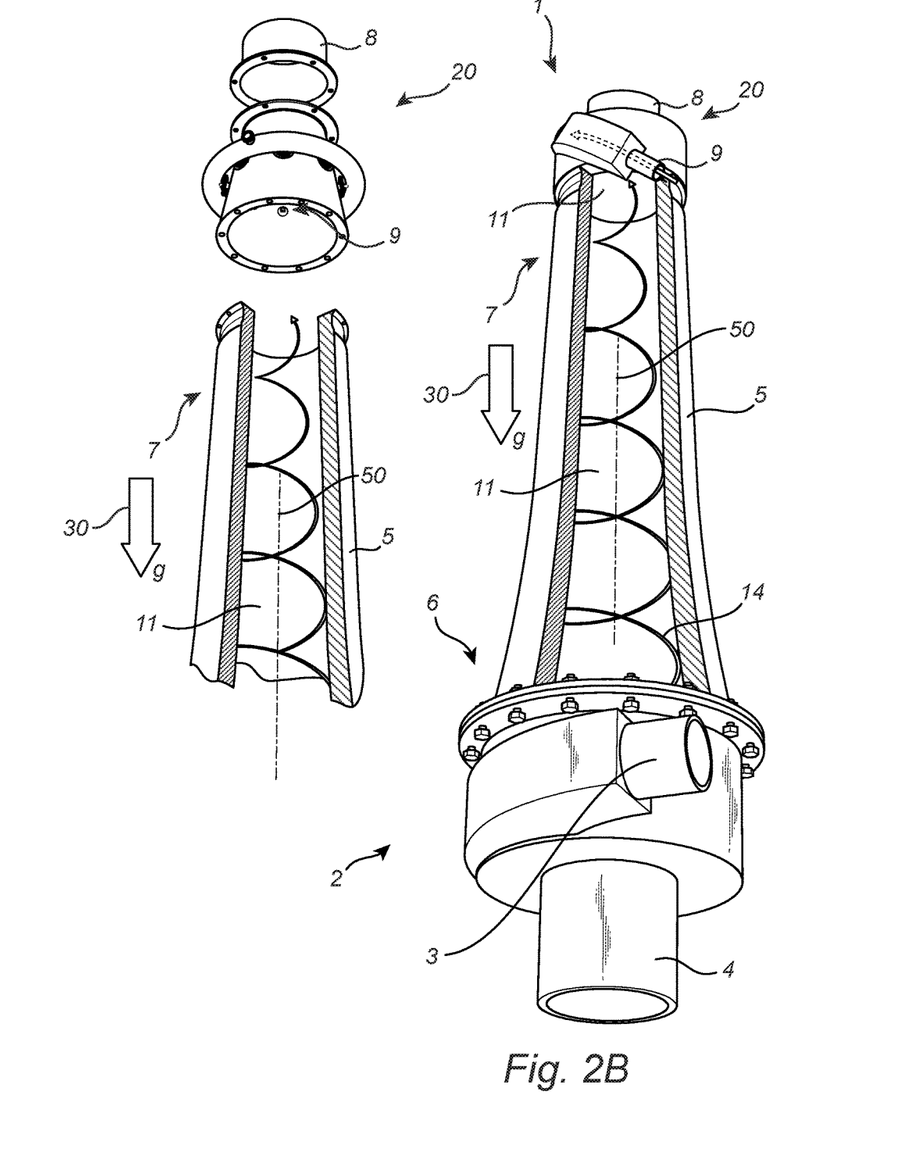
FIG. 2B is a partly exploded partial cut-through perspective view illustration of a portion of a hydrocyclone separator (left) and a partial cut-through perspective view illustration of a hydrocyclone separator (right) according to two embodiments of the present invention.

FIG. 2B illustrates a partly exploded partial cut-through perspective view illustration of a portion of a hydrocyclone separator (left) and a partial cut-through perspective view illustration of a hydrocyclone separator 1 (right) in accordance according to two embodiments of the present invention. Since many parts and components are the same as in FIG. 2A, and the general operating principles of the hydrocyclone separator 1 have already been described, focus will be on the differentiating parts, namely the flow support portions 20. The leftmost, exploded perspective view drawing shows an embodiment where the flow support portion 20 is a separate component/part that is arranged between the tapered separation portion 5 and the apex discharge port 8.

The right-most illustration in FIG. 2B, shows an alternative embodiment where the hydrocyclone comprises a flow support portion 20 having a single flow support inlet 9 configured to inject fluid along at least a portion of the inner surface 11 of the flow support portion 20. More specifically, the flow support inlet 9 is configured to inject a fluid such that it forms a tangential or involute flow along a portion of the inner surface 11 of the flow support portion. The actual inlet can for example be in the form of a slit or similar provided in the inner wall/surface 11 of the flow support portion (similar to the inlet conduit in the head portion). The injected fluid also has an axial component (i.e. the fluid is injected in a direction at least partly towards the apex discharge port) in order to facilitate ejection of the underflow through the apex discharge port 8.

Figure 3A:
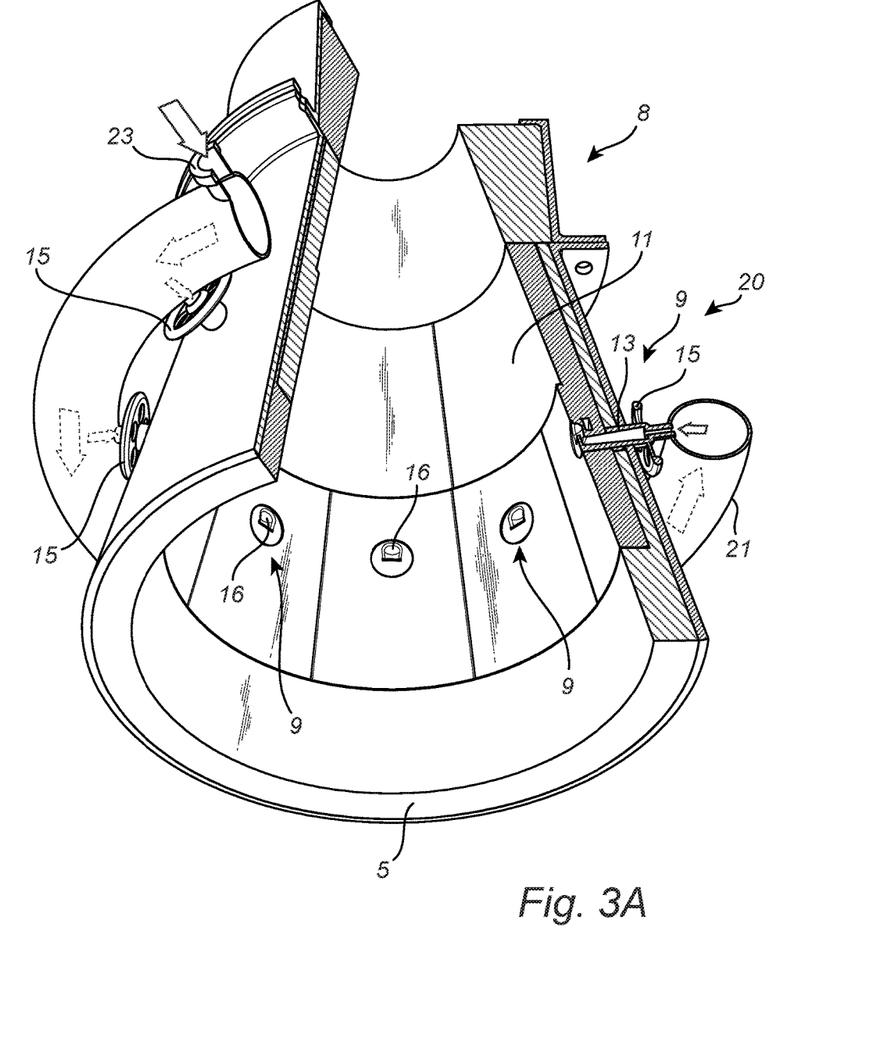
FIG. 3A is an enlarged partial cut-through perspective view illustration of a distal portion of a hydrocyclone separator including the apex discharge port in accordance with an embodiment of the present invention.

In FIG. 3A a partial cut-through perspective view of only a portion of a hydrocyclone separator is illustrated. More specifically, FIG. 3A shows a distal part of the hydrocyclone with an apex discharge port 8 and a flow support portion. The set of flow support inlets 9 are arranged along a circumference of the flow support portion 20.

The flow support inlets 9 are here in the form of nozzles 16 connected to a common supply pipe 21 via a conduit 13 and valve 15. The flow support inlets 9 are arranged to inject a fluid along the inner wall 11 of the flow support portion down towards the apex discharge port 8 and along its inner wall, in order to support the underflow discharge through the apex discharge port 8. As mentioned, the flow support inlets 9 are connected to a common supply pipe 21 having an inlet port 13 into which a fluid is fed (as indicated by the bolded arrows). The common supply pipe 21 encircles the flow support portion 20 radially outwards from the set of flow support inlets 9. By using a common supply pipe 21, installation of the hydrocyclone separator is facilitated as there are less steps in terms of fluid connections to be arranged and such. In other words, the common supply pipe 21 allows for quick and easily installation since there is only one external fluid supply 23 which is to be provided, instead of having to connect each flow support inlet 9 separately.

Figure 3B:
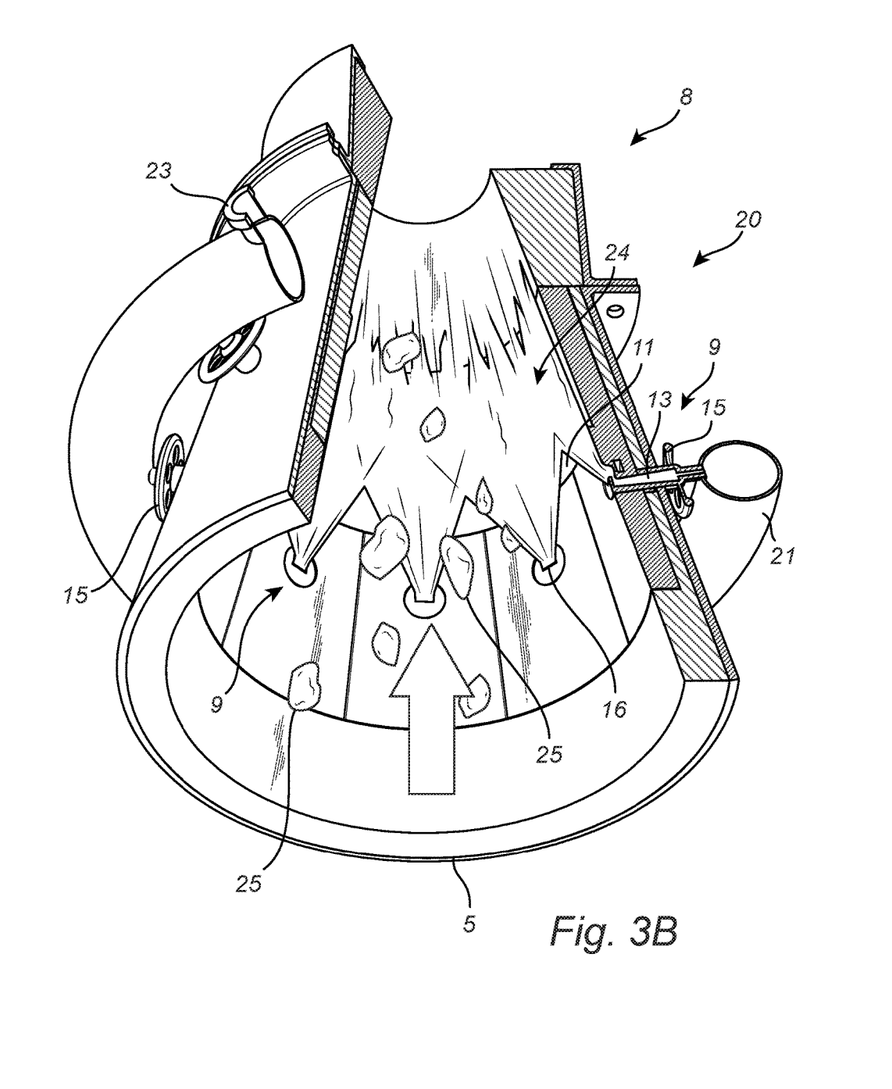
FIG. 3B is similarly to FIG. 3A an enlarged partial cut-through perspective view illustration of the distal portion, but in operation.

FIG. 3B illustrates the portion from FIG. 3A, but in operation. The structural components and various details related thereto have already been discussed in reference to FIG. 3A, and will for the sake of brevity be omitted. The flow support inlets 9 are arranged to inject a fluid along a portion of the inner surface 11 of the flow support portion 20, directly towards the apex discharge port 8. In the embodiment illustrated in FIG. 3B, the flow support inlets 9 are configured to inject or form a sheet of fluid 24 along the inner surface 11. Thereby, if the fluid is a liquid, it will form a type of liquid film or barrier in order to reduce the risk of a dense slurry (here indicated in the form of coarse particles 25) sticking to the inner surfaces 11 and clogging the apex discharge port 8. Alternatively, if the fluid 24 is a gas, it will form a gas cushion to a similar effect.

Figure 3C:
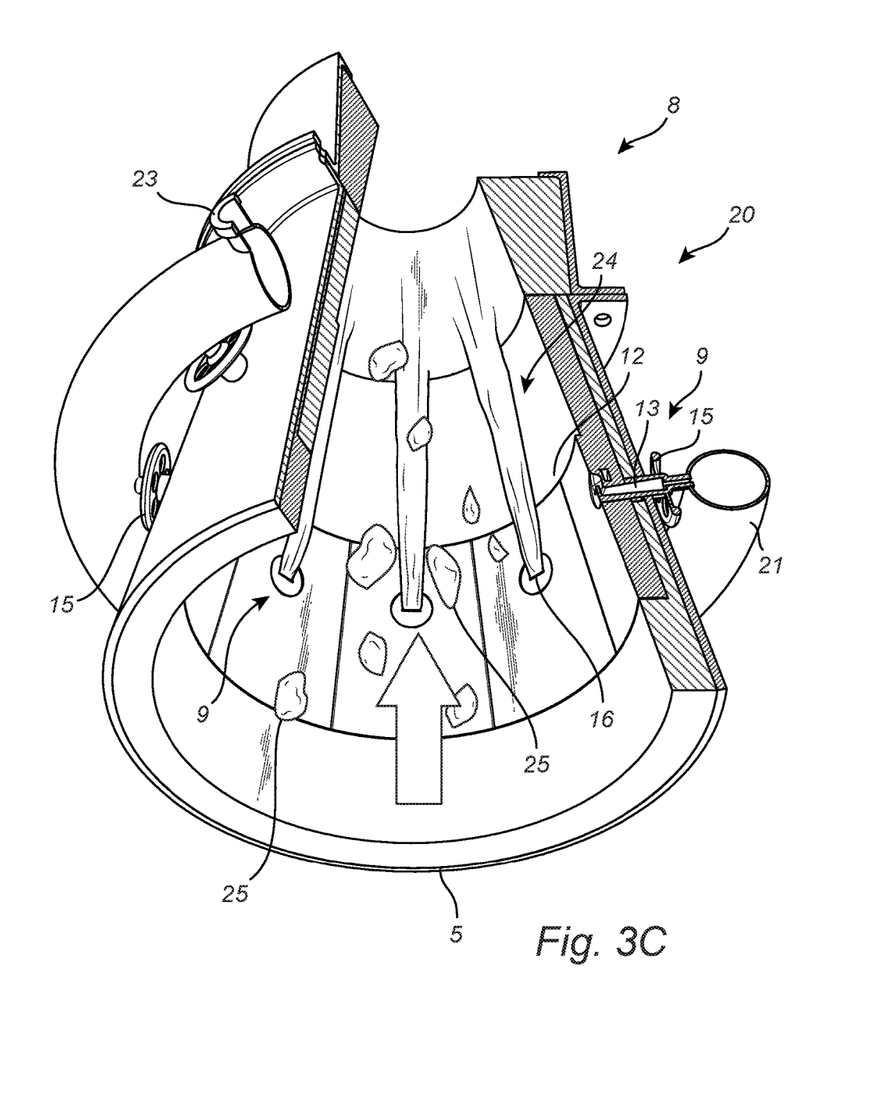
FIG. 3C is similarly to FIG. 3B an enlarged partial-cut through perspective view illustration of the distal portion, but in a different mode of operation.

FIG. 3C illustrates a different mode of operation compared to FIG. 3B. This mode of operation may be performed with the same set of flow support inlets as used in the example shown in FIG. 3B, or a different set of flow support inlets. In FIG. 3C the flow support inlets 9 are injecting multiple streams of fluid along at least a portion of the inner surface of the flow support portion 20, each stream of fluid flowing in a direction towards the apex discharge port 8. In further embodiments it is conceivable to combine injection of fluid formed as a sheet in FIG. 3B with injection of fluid in the form of multiple streams in FIG. 3C.

Figure 4A:
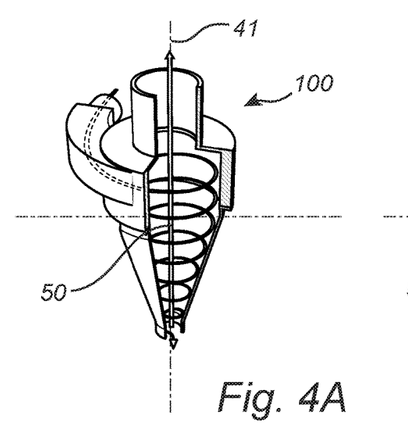
FIG. 4A is a schematic side view illustration of a prior art hydrocyclone separator arranged in straight conventional (0°) orientation.

FIG. 4A shows a schematic illustration of a prior art hydrocyclone separator 100 from a side view perspective. The hydrocyclone separator 100 is arranged in a conventional straight (0°) configuration. The elongated central axis 50 of the hydrocyclone 100 is aligned with a vertical axis 41 (y-axis), forming an angle of 0° between the vertical axis 41 (y-axis) and the elongated central axis 50.

Figure 4B:
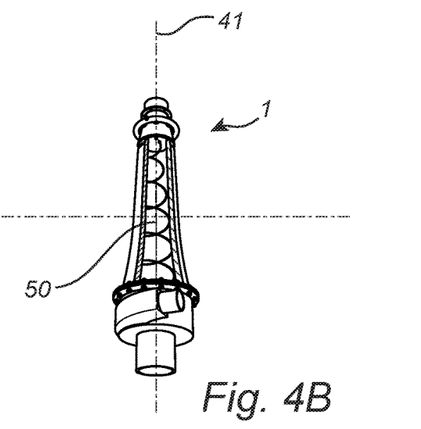
FIG. 4B is a schematic side view illustration of a hydrocyclone separator arranged in an upside down (180°) orientation in accordance with an embodiment of the present invention.

FIG. 4B shows a schematic illustration of a hydrocyclone separator 1 from a side view perspective, in accordance with an embodiment of the present invention. The hydrocyclone 1 is oriented in a straight upside down configuration (also known as an inverted configuration), where the elongated central axis 50 of the hydrocyclone 1 is rotated by 180° relative to the vertical axis 41 (rotated from a conventional straight configuration).

Figure 4C:
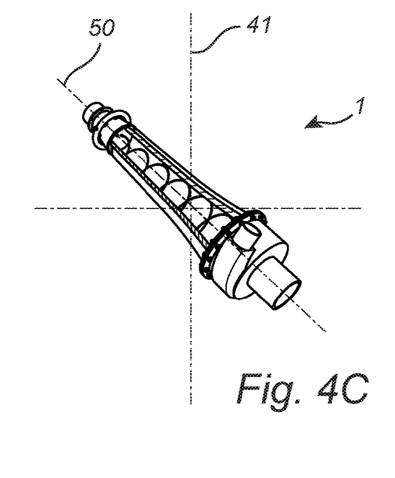
FIG. 4C is a schematic side view illustration of a hydrocyclone separator arranged in an upside down (225°) orientation in accordance with an embodiment of the present invention.

FIG. 4C shows a schematic illustration of a hydrocyclone separator 1 from a side view perspective, in accordance with another embodiment of the present invention. Here, the hydrocyclone 1 is arranged in another upside down orientation/configuration (also known as a semi-inverted configuration), where the elongated central axis 50 of the hydrocyclone is rotated by approx. 225° relative to the vertical axis 41 (rotated from a conventional straight configuration).

Figure 4D:
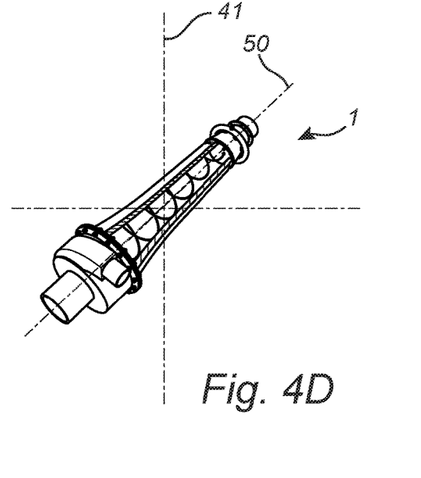
FIG. 4D is a schematic side view illustration of a hydrocyclone separator arranged in an upside down (135°) orientation in accordance with an embodiment of the present invention.

FIG. 4D shows a schematic illustration of a hydrocyclone separator 1 from a side view perspective, in accordance with yet another embodiment of the present invention. Here, the hydrocyclone 1 is arranged in another upside down orientation/configuration (also known as a semi-inverted configuration), where the elongated central axis 50 of the hydrocyclone is rotated by approx. 135° relative to the vertical axis 41 (rotated from a conventional straight configuration). Even though only some specific examples were selected in FIGS. 4B-4D, the hydrocyclone separator may be oriented such that it is rotated by any number of degrees in the range of 91°-269° relative to a vertical axis, such as e.g. 100°, 110°, 125°, 170°, 235°, etc.

Figure 5:
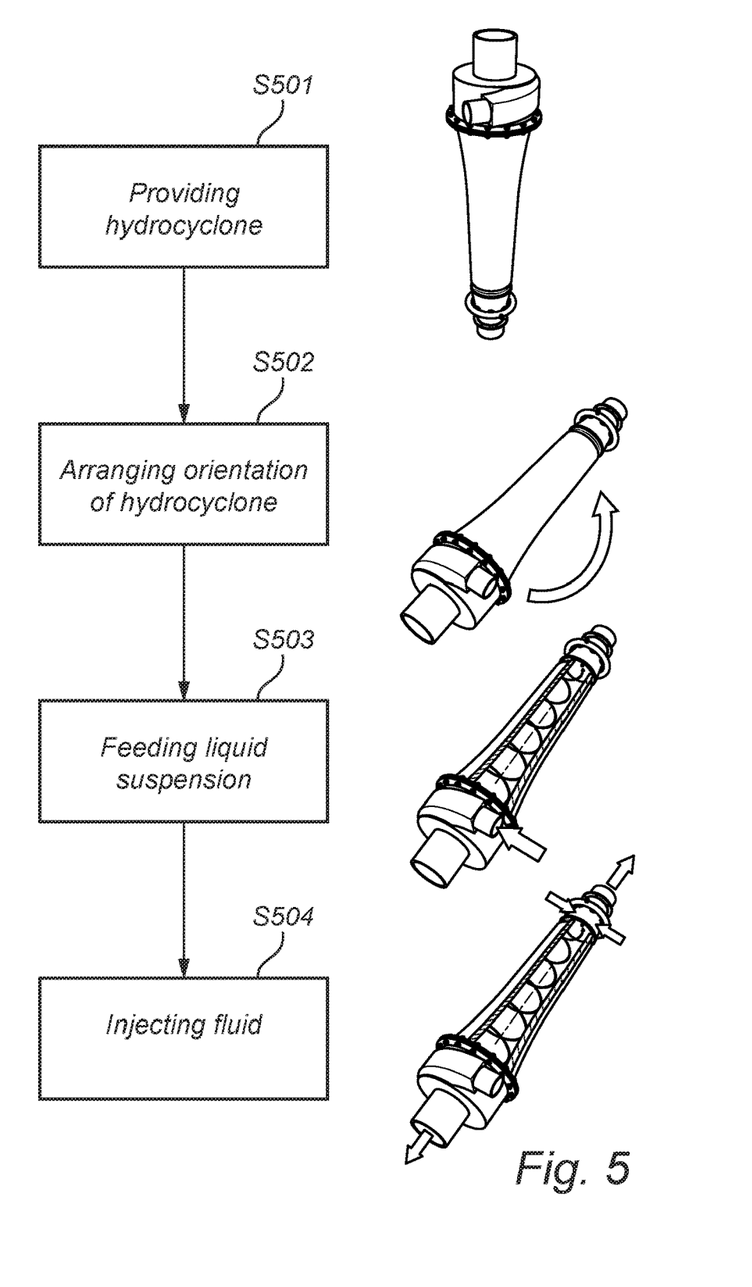
FIG. 5 is a schematic flow chart representation of a method for classifying solid material in liquid suspension in accordance with an embodiment of the present invention.

FIG. 5 illustrates a schematic flow chart representation of a method 500 for classifying solid material in liquid suspension. The method includes a step of providing S501 a hydrocyclone separator, such as a hydrocyclone separator in accordance with any of the above discussed embodiments of the invention. The provided hydrocyclone separator preferably comprises a head portion having an inlet conduit adapted to feed the liquid suspension into the head portion, an overflow discharge tube arranged axially in the head portion, an apex discharge port, a tapered separation portion arranged between the head portion and the apex discharge port, and a flow support portion provided between the tapered separation portion and the apex discharge port.

Further, the hydrocyclone separator is arranged S502 in an orientation such that the apex discharge port is at a vertically elevated position relative to the overflow discharge tube. Stated differently, the hydrocyclone separator is arranged S502 in an upside down orientation.

Next, the liquid suspension is fed S503 into the inlet conduit of the head portion such that a whirling stream of liquid suspension is formed in the hydrocyclone separator. The stream will according accordingly flow in a spiral path (with decreasing radius) towards the apex discharge port, before it turns and forms another oppositely directed whirling stream inside the first whirling stream as known in the art. Furthermore, a fluid (gas or liquid) is injected S504 along at least a portion of an inner surface of the flow support portion in a direction towards the apex discharge port. This injected "secondary" fluid will act to support the underflow discharge and reduce the risk of clogging. The step of injecting S504 the fluid preferably includes injecting a fluid along at least a portion of the inner surface of the flow support portion in a direction transverse to the spiral path of the stream of liquid suspension, i.e. the fluid is injected directly towards the apex discharge port and not tangentially with the spiral path. Since the hydrocyclone has been arranged in an upside down orientation, the step of injecting S504 a fluid preferably includes injecting a fluid at least partly opposite to the direction of gravity. Hereby, the fluid injection will at least partly counteract the gravitational pull which may hinder the underflow discharge through the apex discharge port.

Figure 6A:
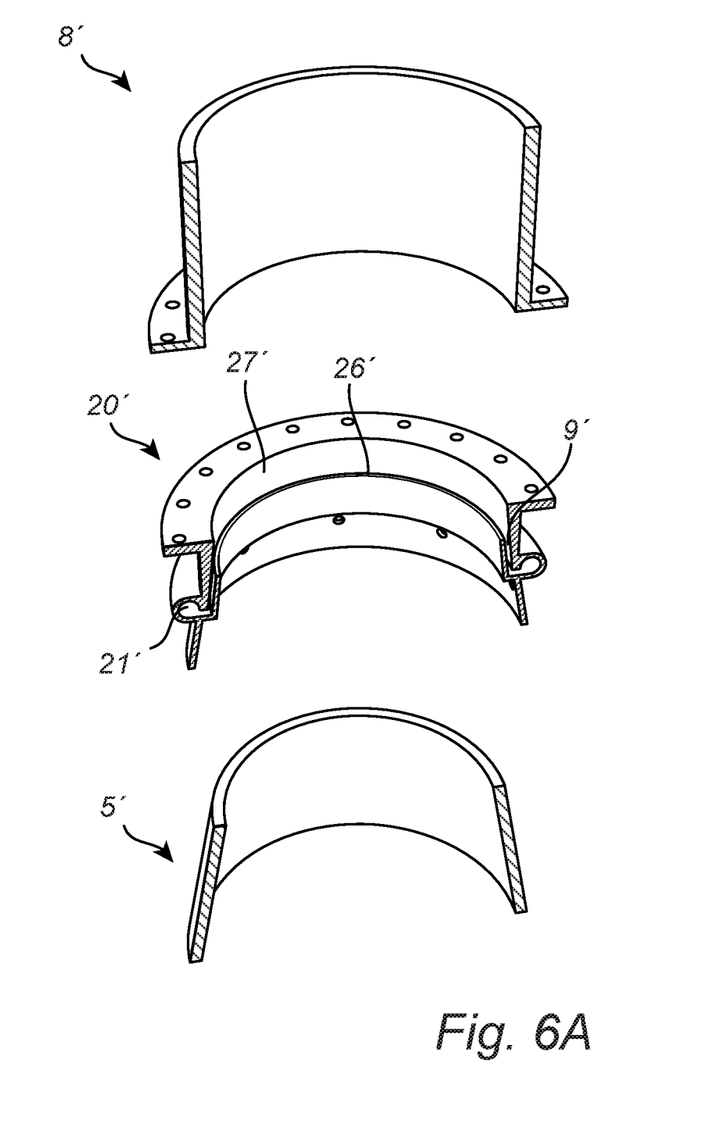
FIG. 6a is a schematic perspective, cross-sectional exploded view in accordance with an embodiment of the present invention.
Figure 6B:
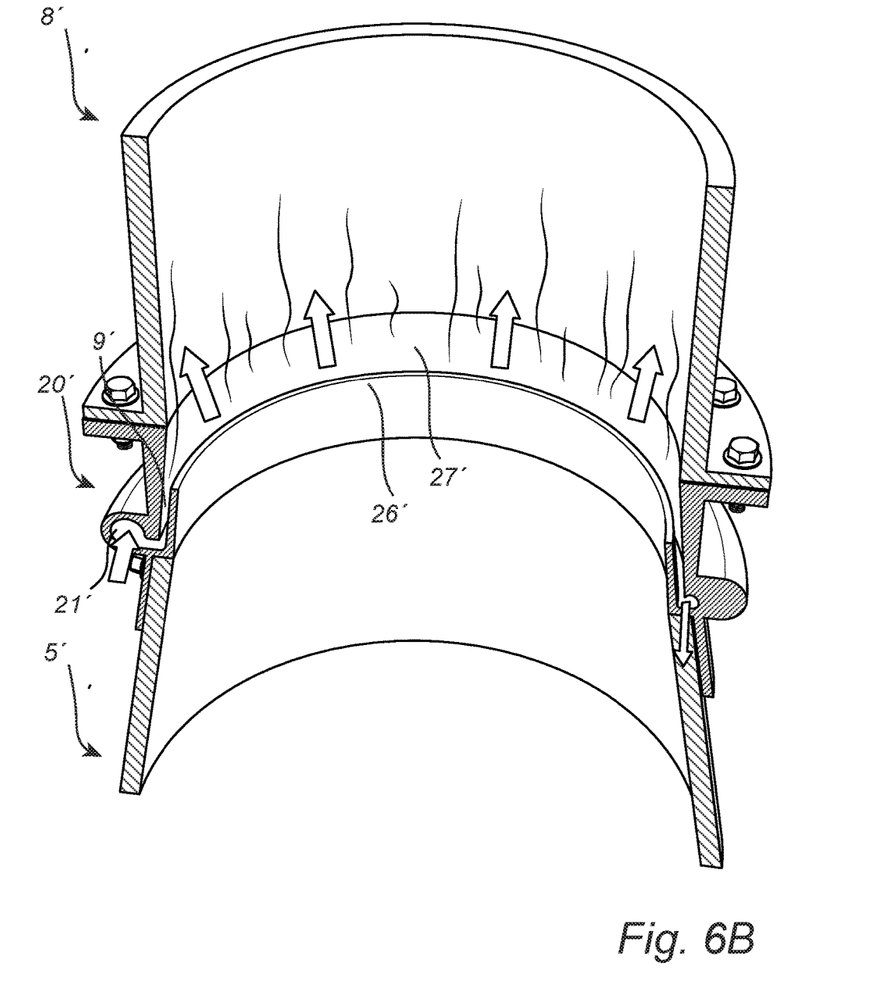
FIG. 6b is a schematic perspective, cross-sectional view in accordance with an embodiment of the present invention.

In FIGS. 6a and 6b, another embodiment of the present invention is disclosed. Here, the flow support portion 20' is disclosed as a separate component or part which is connected between the distal end of the tapered separation portion 5' and the apex discharge port 8'. This allows for quick and simple retrofitting onto conventional hydrocyclone separators. Further, the flow support inlet 9' is embodied as an annular slot arranged extending through the wall of the flow support portion 20' from a supply pipe 21' integrated into the flow support portion 20'. It should be noted that even though it is disclosed as integrated into the flow support portion 20' in the FIGS. 6a and 6b, the supply pipe 21' may also be provided in the form of a separate pipe connected to the flow support inlet 9' by means of e.g. one or more valves. However, the integrated solution has advantages in that the entire annular gap of the flow support inlet 9' can be fed directly from the supply pipe 21'. Further, the internal surface of the flow support portion 20' may have a generally cylindrical shape, which facilitates when the flow support portion 20' is to be used as a retrofit onto an existing hydrocyclone, for example between a cylindrical apex discharge port 8' and a tapered separation portion 5'. By arranging the flow support portion 20' with an inner surface being generally cylindrical, the flow support portion 20' can be inserted in the interface between a cylindrical apex discharge port 8' and a tapered separation portion 5'. It may also be tapered and thus constitute a continuation or an intermediate part of a tapered separation portion 5'. One part of the inner surface of the flow support portion 21' is comprised in at least downstream part of an inner surface 27' of the outer wall of the flow support portion 20' and one part of the inner surface of the flow support portion 21' is comprised of the inner flange 26'. This inner flange 26' defines the annular slot of flow support inlet 9' together with a part of inner surface 27' of the outer wall of the flow support portion 20'. The inner flange 26' may have a wedge shaped cross section or may have a generally rectangular cross section. This will affect the geometry of the annular slot of the flow support inlet. A wedge shaped cross section of the inner flange 26', with a more or less sharp downstream edge, i.e. towards the apex discharge port 8', will create a smoother transition towards the inner surface 27' of the outer wall of the flow support portion 21'.

As previously discussed, since the hydrocyclone is, during operation, in an upside down orientation (may also be referred to as inverted or semi-inverted orientation), the underflow discharge is supported by feed pressure and opposed by gravity, in contrast to conventional systems where the underflow discharge is supported by feed pressure and by gravity. The flow support inlet 9' the form of an annular gap accordingly at least partly compensates for the gravitational pull in the inventive hydrocyclone separator. The step of injecting a fluid will in this embodiment form a sheet of fluid along at least a portion of the inner surface of the flow support portion 20', the sheet of fluid flowing in a direction towards the apex discharge port. The sheet of fluid will accordingly form a type of cushion or spacer layer between the dense slurry flowing through the apex discharge port (i.e. the underflow). In operation, a fluid is fed into the supply pipe 21' in a tangential or volute path through the outer wall of the flow support portion 20' and through the annular slot of the flow support inlet 9'. The flow of fluid is thus introduced into the hydrocyclone having a tangential component and an axial component and covering the whole surface of the flow support portion 20' and then the whole surface of the apex discharge port 8', if arranged in connection with the apex discharge port 8', or an inner surface the tapered separation portion 5' if arranged between two sections of the tapered separation portion 5'. The combination of tangential fluid entry with an inclined annular slot of the flow support inlet 9' will result in a spray of fluid along the surface that has a similar sliding vector to the slurry flowing toward the apex from the tapered separation portion 5'. Thereby, if the fluid is a liquid, it will form a type of liquid film or barrier in order to reduce the risk of dense slurry sticking to the inner surfaces and clogging the apex discharge port 8'. Alternatively, if the fluid is a gas, it will form a gas cushion to cause a similar effect. Furthermore, even though the embodiment in FIGS. 6a and 6b are generally presented as a retrofit solution, it could also be incorporated in a hydrocyclone during manufacture thereof and the same advantages will apply as indicated above.

Furthermore, the skilled person realizes that a number of modifications of the embodiments described herein are possible without departing from the scope of the invention, which is defined in the appended claims. For example, the separation part according to the invention need not necessarily be conical in a strict meaning. As long as the inner diameter is generally reduced from a top end towards a bottom end, it can have a plurality of different cone angles along its longitudinal axis and can also have more of a curved appearance, i.e. having a continuously changing cone angle. Moreover, the set of flow support inlets may comprise any number of inlets which may or may not be individually controllable in terms of flow, direction, injection spread angle, etc. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

We claim:

1. A hydrocyclone separator for classifying solid material in liquid suspension, comprising:
   a head portion having an inlet conduit adapted to feed a suspension into the head portion;
   an overflow discharge tube arranged in the head portion;
   an apex discharge port;
   a tapered separation portion arranged between the head portion and the apex discharge port, the tapered separation portion having a proximal end and a distal end, and wherein said tapered separation portion tapers towards said distal end;
   a flow support portion provided at the tapered separation portion or between the tapered separation portion and the apex discharge port, said flow support portion comprising at least one flow support inlet configured to inject a fluid along at least a portion of an inner surface of the flow support portion in a direction at least partly towards the apex discharge port
   wherein said hydrocyclone separator is configured to be oriented such that said apex discharge port is at a vertically elevated position relative to the overflow discharge tube.

2. The hydrocyclone separator according to claim 1, wherein said flow support portion comprises a plurality of flow support inlets configured to inject a fluid along at least a portion of an inner surface of the flow support portion in a direction towards the apex discharge port.

3. The hydrocyclone separator according to claim 2, wherein said plurality of flow support inlets are arranged along a circumference of the flow support portion.

4. The hydrocyclone separator according to claim 1, wherein said flow support inlet(s) is/are arranged to inject liquid.

5. The hydrocyclone separator according to claim 1, wherein said flow support inlet(s) is/are arranged to inject gas.

6. The hydrocyclone separator according to claim 2, wherein said plurality of flow support inlets are arranged to inject a fluid along at least a portion of the inner surface of the flow support portion in a direction directly towards the apex discharge port.

7. The hydrocyclone separator according to claim 1, wherein said flow support inlet(s) is/are configured to inject a sheet of fluid along at least a portion of the inner surface of the flow support portion, said sheet of fluid flowing in a direction at least partly towards the apex discharge port.

8. The hydrocyclone separator according to claim 2, wherein said plurality of flow support inlets is configured to inject a plurality of streams of fluid along at least a portion of the inner surface of the flow support portion, each stream of fluid flowing in a direction towards the apex discharge port.

9. The hydrocyclone separator according to claim 1, wherein each flow support inlet is oriented so to inject a fluid in a direction at least partly opposite to the direction of gravity, when said hydrocyclone separator is oriented such that said apex discharge port is at a vertically elevated position relative to the overflow discharge tube.

10. The hydrocyclone separator according to claim 1, wherein said at least one flow support inlet is arranged in the form of an annular slot arranged along a circumference of the flow support portion.

11. The hydrocyclone separator according to claim 10, wherein said at least one flow support inlet arranged in the form of an annular slot along a circumference of the flow support portion is configured to inject a sheet of fluid along at least a portion of the inner surface of the flow support portion.

12. The hydrocyclone separator according to claim 10, wherein said annular slot is axially inclined.

13. The hydrocyclone separator according to claim 10, wherein said annular slot is defined by an outer wall of the flow support portion and an inner flange portion.

14. The hydrocyclone separator according to claim 13, wherein an inner surface of said inner flange portion is flush with an inner surface of the tapered separation portion.

15. The hydrocyclone separator according to claim 13, wherein said inner surface of said inner flange portion is substantially cylindrical.

16. A system comprising a plurality of hydrocyclone separators according to claim 1.

17. A method for classifying solid material in liquid suspension comprising:
providing a hydrocyclone separator comprising a head portion having an inlet conduit adapted to feed the liquid suspension into the head portion, an overflow discharge tube arranged in the head portion, an apex discharge port, a tapered separation portion arranged between the head portion and the apex discharge port, and a flow support portion provided between the tapered separation portion and the apex discharge port;
arranging the hydrocyclone separator in an orientation such that the apex discharge port is at a vertically elevated position relative to the overflow discharge tube;
feeding the liquid suspension into the inlet conduit such that a whirling stream of liquid suspension is formed in the hydrocyclone separator, said stream flowing in a spiral path towards the apex discharge port;
injecting a fluid along at least a portion of an inner surface of the flow support portion in a direction at least partly towards the apex discharge port.

18. The method according to claim 17, wherein the step of injecting a fluid comprises injecting a fluid along at least a portion of the inner surface of the flow support portion in a direction transverse to said spiral path of the stream of liquid suspension and directly towards said apex discharge port.

19. The method according to claim 17, wherein the step of injecting a fluid further comprises injecting a fluid in a direction at least partly opposite to the direction of gravity.

20. The method according to claim 17, wherein the step of injecting a fluid further comprises forming a sheet of fluid along at least a portion of the inner surface of the flow support portion, said sheet of fluid flowing in a direction towards the apex discharge port.

21. The method according to any claim 17, wherein the step of injecting a fluid further comprises injecting multiple streams of fluid along at least a portion of the inner surface of the flow support portion, each stream of fluid flowing in a direction towards the apex discharge port.

22. Flow support portion for arrangement at a tapered separation portion or between a tapered separation portion and an apex discharge port of a hydrocyclone separator for classifying solid material in liquid suspension, said flow supporting portion comprising at least one flow support inlet configured to inject a fluid along at least a portion of an inner surface of the flow support portion in a direction at least partly towards said apex discharge port, said at least one flow support inlet is arranged in the form of an annular slot arranged along a circumference of the flow support portion.

23. Flow support portion according to claim 22, wherein said at least one flow support inlet arranged in the form of an annular slot along a circumference of the flow support portion is configured to inject a sheet of fluid along at least a portion of the inner surface of the flow support portion.

24. Flow support portion according to claim 22, wherein said annular slot is axially inclined.

25. Flow support portion according to claim 22, wherein said annular slot is defined by an outer wall of the flow support portion and an inner flange portion.

26. Flow support portion according to claim 25, wherein an inner surface of said inner flange portion arranged to be flush with an inner surface of the tapered separation portion.

27. Flow support portion according to claim 25, wherein said inner surface of said inner flange portion is substantially cylindrical.

28. Flow support portion according to claim 25, wherein said inner surface of said inner flange is substantially cylindrical.

* * * * *